(12) United States Patent  (10) Patent No.: US 7,850,410 B1
Curtis  (45) Date of Patent:  Dec. 14, 2010

(54) FASTENER APPARATUS WITH SELF-LEVELING HEAD

(76) Inventor: David Anthony Wayne Curtis, P.O. Box 1046, Verdi, NV (US) 89439

( * ) Notice: Subject to any disclaimer, the term of this patent is extended or adjusted under 35 U.S.C. 154(b) by 531 days.

(21) Appl. No.: 11/732,865

(22) Filed: Apr. 4, 2007

(51) Int. Cl.
*F16B 43/02* (2006.01)

(52) U.S. Cl. .................................... 411/537; 411/542

(58) Field of Classification Search ............... 411/368, 411/369, 371.1, 371.2, 537, 542, 380
See application file for complete search history.

(56) References Cited

U.S. PATENT DOCUMENTS

| | | | |
|---|---|---|---|
| 1,352,918 A * | 9/1920 | Rohbock | 411/392 |
| 3,149,850 A * | 9/1964 | Fischer | 411/542 |
| 3,160,054 A * | 12/1964 | Cohen et al. | 411/371.1 |
| 3,422,721 A * | 1/1969 | Yonkers | 411/369 |
| 3,606,357 A * | 9/1971 | Yonkers | 411/537 |
| 3,788,185 A | 1/1974 | Gutshall | |
| 3,882,752 A | 5/1975 | Gutshall | |
| 4,362,449 A | 12/1982 | Hlinsky | |
| 4,686,808 A * | 8/1987 | Triplett | 52/410 |
| 4,860,513 A * | 8/1989 | Whitman | 52/410 |
| 5,168,684 A * | 12/1992 | Bruhm | 52/410 |
| 5,534,027 A * | 7/1996 | Hodorek | 128/898 |
| 5,667,347 A | 9/1997 | Matthews | |
| 6,282,857 B1 * | 9/2001 | Rubenacker | 52/410 |
| 6,764,262 B1 * | 7/2004 | Hargis | 411/371.1 |
| 7,329,077 B2 * | 2/2008 | Curtis | 411/371.1 |
| 2004/0052610 A1 | 3/2004 | Kaupanger | |

* cited by examiner

*Primary Examiner*—Flemming Saether
(74) *Attorney, Agent, or Firm*—Charles L. Thoeming

(57) ABSTRACT

Fastener apparatus including a self-adjusting and automatically self-leveling head separate from a threaded shank portion. An embodiment of the apparatus provides a self-leveling head portion defining an annular conical recess and lip portion sized to receive a seal. A threaded shank resides within an annular cup center of the self-leveling head and has a thread-free portion seated by the compressed seal creating a water tight seal.

2 Claims, 7 Drawing Sheets

FASTENER APPARATUS WITH SELF-LEVELING HEAD

CROSS REFERENCE TO RELATED APPLICATIONS

Not Applicable.

STATEMENT REGARDING FEDERALLY SPONSORED RESEARCH AND DEVELOPMENT

Not Applicable

REFERENCE TO MICROFICHE APPENDIX

Not Applicable

TECHNICAL FIELD

The present invention relates generally to construction hardware, and more particularly to an improved fastener apparatus for metal roofing and steel building construction.

BACKGROUND INFORMATION AND DISCUSSION OF RELATED ART

Fasteners for use in roofing and steel building construction currently include the ring shank self-sealing nail, the self sealing hex head. Manufacturers of these fasteners recommend these said existing fasteners be replaced every five years. This replacement is necessary because the rubber seals used on these fasteners are damaged by the sun's UV Rays due to their exposed nature. In addition, snow falls and lands on the rooftop, and gravity causes the snow to slide downhill which builds up against the vertical walls of the hex head and increases in weight. Eventually the weight of the snow and ice overwhelms the holding power of the existing fasteners and with the aid of gravity the snow and ice unload, violently sliding over the existing fasteners and causing damage to the fasteners and their seals.

U.S. Pat. No. 6,764,262 to Hargis discloses a weatherproof fastener having a shank and head, the latter formed with a recess in its lower surface. A gasket is positioned in the recess, which it partially fills until the screw is employed to joint two elements and the gasket is compressed so that it fills the entirety of the recess, thereby preventing to ingress of undesirable materials. Hargis fails to consider the solid connection between the said head and said shank create a "T" shape, which when the fastener is applied at any off angle other than perfectly vertical, will allow the ingress of undesirable materials to the underside of the head as it becomes exposed to sliding snow and ice and UV Rays. When the fastener is applied at an off angle one side will touch the workpiece and the opposite side will rise up creating a gap between the workpiece and the outer rim of said head, therefore allowing the ingress of said materials.

The foregoing patents reflect the current state of the art of which the present inventor is aware. Reference to, and discussions of, these patents is intended to aid in discharging Applicant's acknowledged duty of candor in disclosing information that may be relevant to the examination of claims to the present invention. However, it is respectfully submitted that none of the above-indicated patents disclose, teach or suggest, show or otherwise render obvious, either singly or when considered in combination, the invention described and claimed herein.

BRIEF SUMMARY OF THE INVENTION

The present invention provides an improved fastener apparatus for use in roofing and steel building construction. The inventive fastener provides a self-adjusting and automatically self-leveling head which is separate from the threaded shank portion. Said head portion provides a frusto-hemispherical head, a curved outer surface, a base portion, a peripheral edge, and a hollow center having in the form of a rounded annular cup, said rounded annular cup center is wider and near vertical at the uppermost portion which curves and narrows towards horizontal at the lower portion, and is designed to accept a separate threaded shank portion to be inserted through the hollow center of said head portion. Said shank portion having threads at the first end, and a rounded ball head at the second end, and a flat top surface bearing a tool fitting. When combined said annular cup head portion and said rounded ball shank portion create a free moving ball joint which allows the free moving head to self level under compression of installation regardless of which angle the threaded shank portion is installed. Said Head portion has a downwardly-appending lip portion which extends from the peripheral edge and defines an annular recess in the base portion, the annular recess having a flat upper surface which transitions into a vertical downwardly-appending lip portion, said vertical transfers into a annular wall at approximately 100 to 110-degrees, said annular wall ends in a curved lowermost bottom of the annular lip portion, said bottom of the lip portion is substantially flat, said flat bottom of the downwardly appending lip portion curves and transfers into an upwardly-appending peripheral edge, said peripheral edge of the lip portion slopes outward at approximately 110-degrees, said peripheral edge at 110-degrees transfers into the frusto-hemispherical head. Said recess and downwardly appending lip portion should be deep enough to accommodate a large seal and said threaded shank should be free of threads so when combined the seal can properly seat around the shank and create a water tight seal.

The inventive self leveling head feature will address the fastener head perimeter and downwardly-appending lip portion from scratching the painted workpiece during installation. Since the first portion of the seal will make contact with the workpiece as it is being fastened, this portion of the seal will begin to compress and will provide resistance, the remaining portion of the seal that has not made contact with the workpiece will not have any resistance and is free to make contact with the workpiece which will adjust the free moving head to a level position before final compression of the seal occurs, the entire head will then be flush and level.

A second thin seal should also be inserted between said rounded ball head of the threaded shank portion, and the rounded cup portion of said free flowing head which contains the recess. The addition of this second seal is mainly to provide a barrier between said ball and said cup which create the self adjusting head in order to stop rusting and electrolysis, and secondarily to stop the ingress of water into the recess through the two separate said cup and ball portions which combine to create the entire head of the self-leveling fastener.

The individual heads of the inventive fastener should combine to create one head, and be as low profile as possible to reduce friction between the fastener and unloading snow and ice which can shear the head of the fastener and tear the entire fastener from the installed position. As the afore mentioned Hex Head fasteners create a catch which causes a build-up of snow and ice, whereas the vertical sides and high profile of the Hex fasteners head actually catch snow and ice and stop it from naturally unloading off the roof due to the pull of gravity.

The lip should have six specific features to it. The first is on the inside of the lip, the top 20% of the annular recess is vertical in order to catch the top portion of the seal and stop it from expanding wider which will cause instantaneous resistance between the seal and the workpiece in order to self level the head, the second 70% portion of the annular recess wall transitions into a 110-degree sloping wall which gets wider as it nears the bottom of the lip allowing the seal to slowly expand and fill the recess, the third 10% portion is rounded so the seal escaping the recess and under the lip is not pinched or cut by the inside of the recess wall, the bottommost portion of the lip is substantially flat and substantially wide to accommodate a portion of seal and to create a scratch barrier between said lip and said workpiece being fastened, the bottommost said flat portion transitions into a rounded portion which removes any sharp edges that may scratch the workpiece being fastened, and the outer peripheral edge slopes up towards the main body of the fastener head at a 110-degree angle, this section creates a horizontal V-shaped cavity which accommodates the excess seal that escapes from the recess to be protected from unloading snow and ice as it resides within the horizontal V-shape created between the workpiece and the peripheral edge at a 110-degree angle of the edge. The purpose of this inventive recess lip portion is to work in unison with the seal, the workpiece, and the free moving head of the fastener, to self-level the head portion regardless of the angle the threaded portion is installed. As the fastener is installed the seal located inside the recess makes first contact with the workpiece and is sandwiched between said free moving head and said workpiece being fastened, the seal is then slightly compressed and begins to expand in an outward direction, the short top 20% vertical wall of the lip portion is designed to stop the seal from expanding wider as it makes contact with said vertical recess wall, this contact transitions the expansion of the seal from a sideways motion into a downward direction, this contact also creates immediate and increased resistance from the seal which causes the free moving head portion to self-level itself with the aid of said resistance. Once said free moving head has self leveled with the aid of said short vertical wall and increased resistance from the seal, the lowermost portion of the seal is allowed to gradually expand along the angled 110-degree mid portion and fill the remaining recess. The extreme bottommost portion of the inner recess wall is rounded and will not damage the rubber seal as it expands at an acceptable rate for the composition of the rubber seal, and eventually escaping from the recess which provides a scratch barrier between the lip of the fastener head and the workpiece being fastened. Further, the substantially flat and substantially wide bottom of the lip portion is designed to accommodate escaping seal and aid in the self-leveling aspects of said free moving head, also creating a scratch barrier between said lip portion and said workpiece. And the final portion of the downwardly-appending lip portion is the peripheral edge, it is designed at a 110-degree outward angle to accommodate a small amount of seal which may completely escape from the recess and even beyond the lip portion of the recess to stop the ingress of undesirable materials and water.

The separation of said threaded shank portion with a rounded ball head, and said head portion with rounded cup, combine and create a ball joint which allows the threaded shank portion to spin during installation and the free moving head portion to be held by the installer without said head portion spinning in the installers fingers, further, as the head and seal make contact with said workpiece being fastened the rubber seal contained inside the recess is not subjected to extreme twisting and binding which causes damage to the seal during installation.

It is therefore an object of the present invention to provide an improved fastener that can withstand the elements.

It is another object of the present invention to provide a new and improved fastener that provides easier installation for the operator.

It is another object of the present invention to provide a new and improved fastener that protects the seal from extreme forces under the installation process including twisting, binding, rolling and heat generated by the friction caused during the final seating of installation.

It is another object of the present invention to provide a new and improved fastener in which the head self levels and provides a tighter seal in order to stop the ingress of undesirable materials under the head which the existing fasteners that have a solid head to shank connection cannot provide.

A further object of the present invention is to provide a novel fastener that will not scratch the painted surface of the workpiece due to the self leveling aspect of the separated head and shank.

An even further object of the present invention is to provide a novel fastener that will not cause rusting and electrolysis between the fastener head and the workpiece.

Other novel features which are characteristic of the invention, as to organization and method of operation, together with further objects and advantages thereof will be better understood from the following description considered in connection with the accompanying drawing, in which preferred embodiments of the invention are illustrated by way of example. It is to be expressly understood, however, that the drawing is for illustration and description only and is not intended as a definition of the limits of the invention. The various features of novelty which characterize the invention are pointed out with particularity in the claims annexed to and forming part of this disclosure. The invention resides not in any one of these features taken alone, but rather in the particular combination of all its structures for the functions specified.

There has thus been broadly outlined the more important features of the invention in order that the detailed description thereof that follows be better understood, and in order that the present contribution to the art may be better appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important, therefore, that the claims be regarded as including such equivalent constructions insofar as they do not depart from the spirit and scope of the present invention.

Certain terminology and derivations thereof may be used in the following description for convenience in reference only, and will not be limiting. For example, words such as "upward," "downward," "left," and "right" would refer to directions in the drawings to which reference is made unless otherwise stated. Similarly, words such as "inward," and "outward" would refer to directions toward and away from, respectively, the geometric center of a device or area and designated parts thereof. References in the singular tense include plural, and vise versa, unless otherwise noted.

BRIEF DESCRIPTION OF THE SEVERAL VIEWS OF THE DRAWINGS

The invention will be better understood and objects other than those set fourth above will be come apparent when consideration is given to the following detailed description thereof. Such description makes reference to the annexed drawings wherein.

FIG. 1-A is a side elevation view of this fastener with the threaded shank portion installed in a vertical position.

FIG. 1-B is a side elevation view of the fastener with the threaded shank portion installed at an off angle of approximately 20-Degrees from vertical, noting that the free flowing head portion has self leveled automatically and equal pressure has been applied to the seal.

FIG. 2 includes illustrations 2-A, 2-B and 2-C, and is a side elevation view of this fastener.

FIG. 2-A is a side elevation view of the individual components in an unassembled position.

FIG. 2-B is the individual components of this inventive fastener assembled, with the threaded shank installed in a 20-degree off vertical angled position.

FIG. 2-C is also the individual components assembled, but with the threaded shank installed in a vertical position.

FIG. 6 includes illustrations 6-A, 6-B and 6-C, and is a side elevation view used as an example of existing solid connecting head and shank head technology that cannot FIG. 6-A is a side elevation view of existing solid connecting head and shank head technology installed at the vertical position, which is the only acceptable position for this solid "T-shaped" design.

FIG. 6-B is a side elevation view of existing solid connecting head and shank head technology installed at a 15-degree off of vertical angle.

FIG. 6-C is a side elevation view of existing solid connecting head and shank head technology installed at a 25-degree off of vertical angle.

FIG. 7 includes illustrations 7-A, 7-B and 7-C, and is a cross section side elevation view used as an example to illustrate the proper seating of the seal as it is installed, as it secures itself around the center shank, and how the recess wall works as the fastener tightens down into a completely installed position FIG. 7-A sows the seal in an uncompressed state prior to the seal making contact with the workpiece.

FIG. 7-B illustrates how the seal has begun to compress and the recess wall causes the seal to secure itself around the center of the shank.

FIG. 7-C shows the seal in a final installed position.

DETAILED DESCRIPTION OF THE INVENTION

Referring to FIGS. 1 through 7, wherein like reference numerals refer to like components in various views, there is illustrated therein a new and improved fastener apparatus, generally denominated 100 herein.

Figure 1:
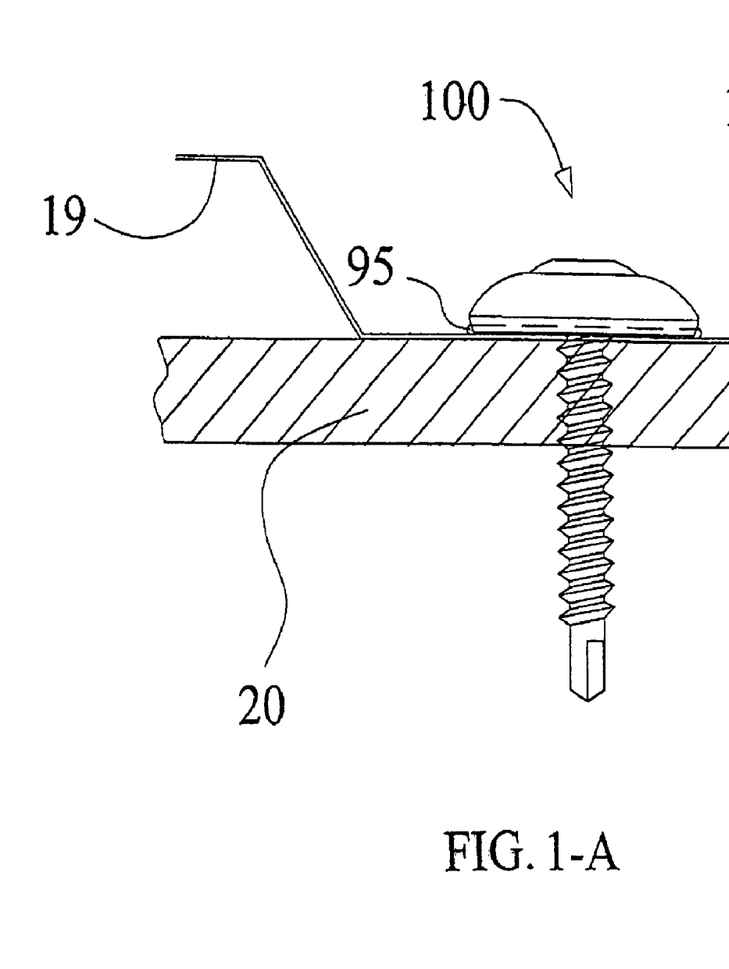
FIG. 1 includes illustrations 1-A and 1-B, are a side elevation view of this inventive fastener fully assembled and installed.
Figure 2A:
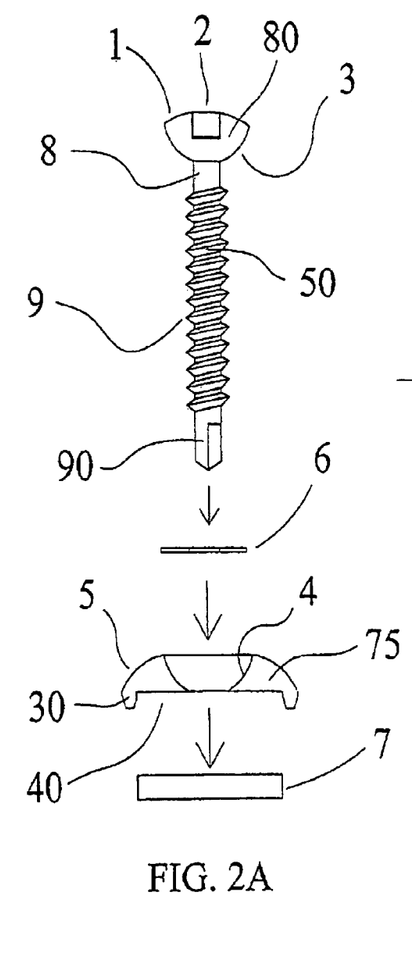
Figure 2B:
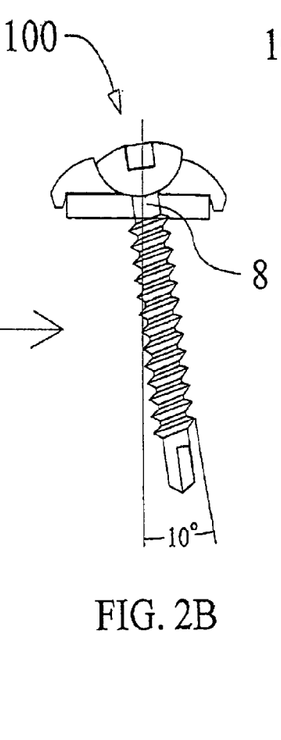
Figure 2C:
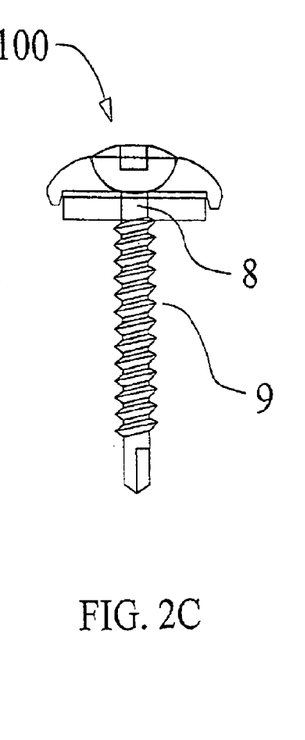
Figure 3:
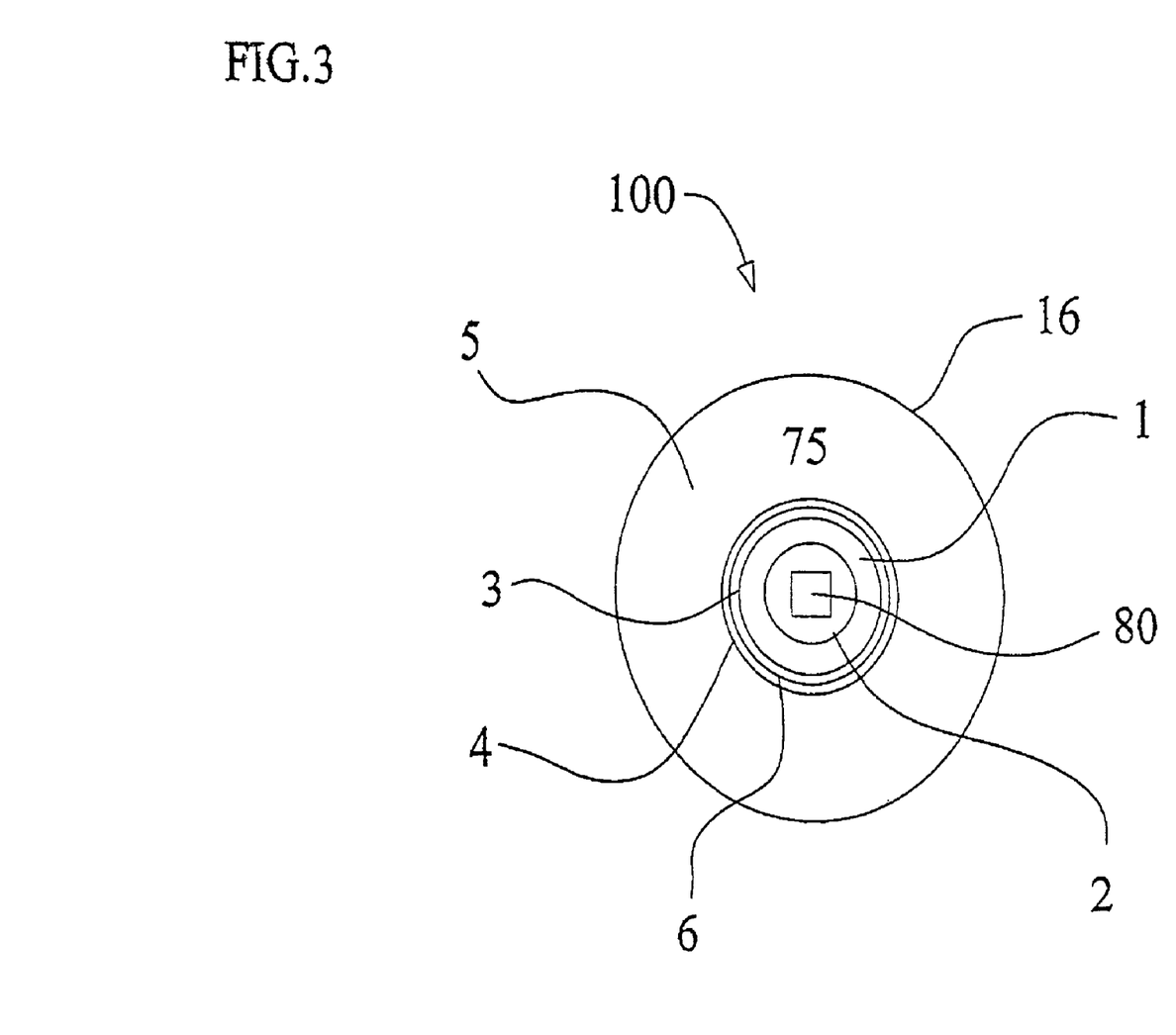
FIG. 3 is a top elevation view of the head of this inventive fastener.
Figure 4:
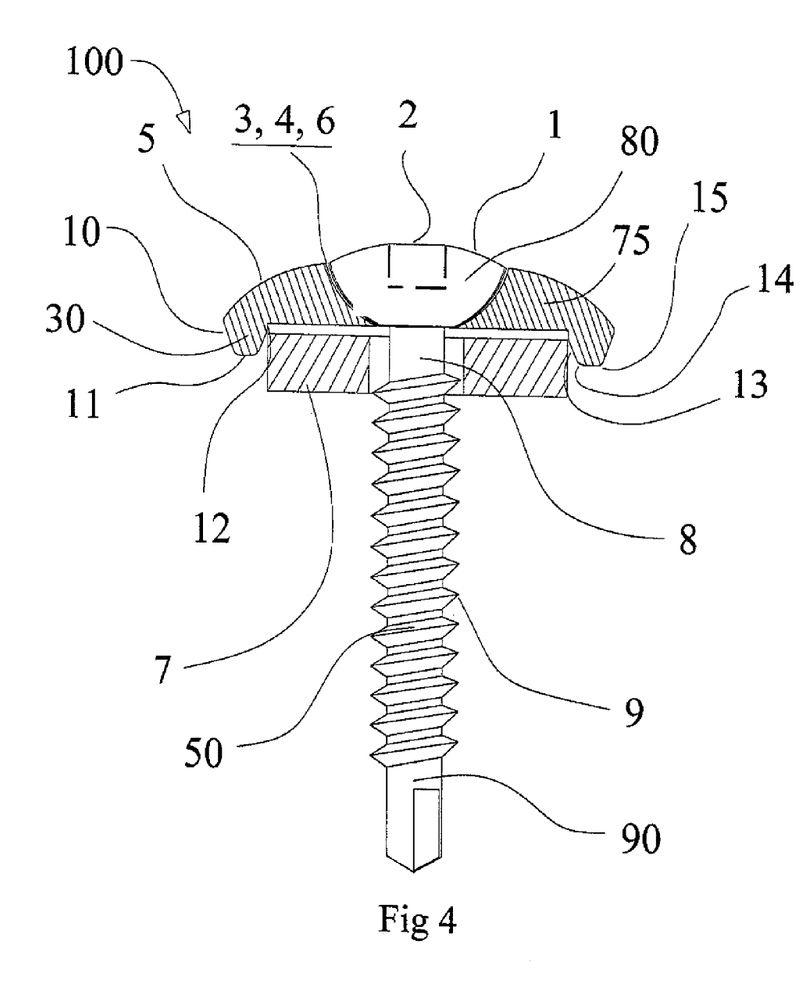
FIG. 4 is a side elevation view in a cross section of the fastener apparatus.
Figure 5:
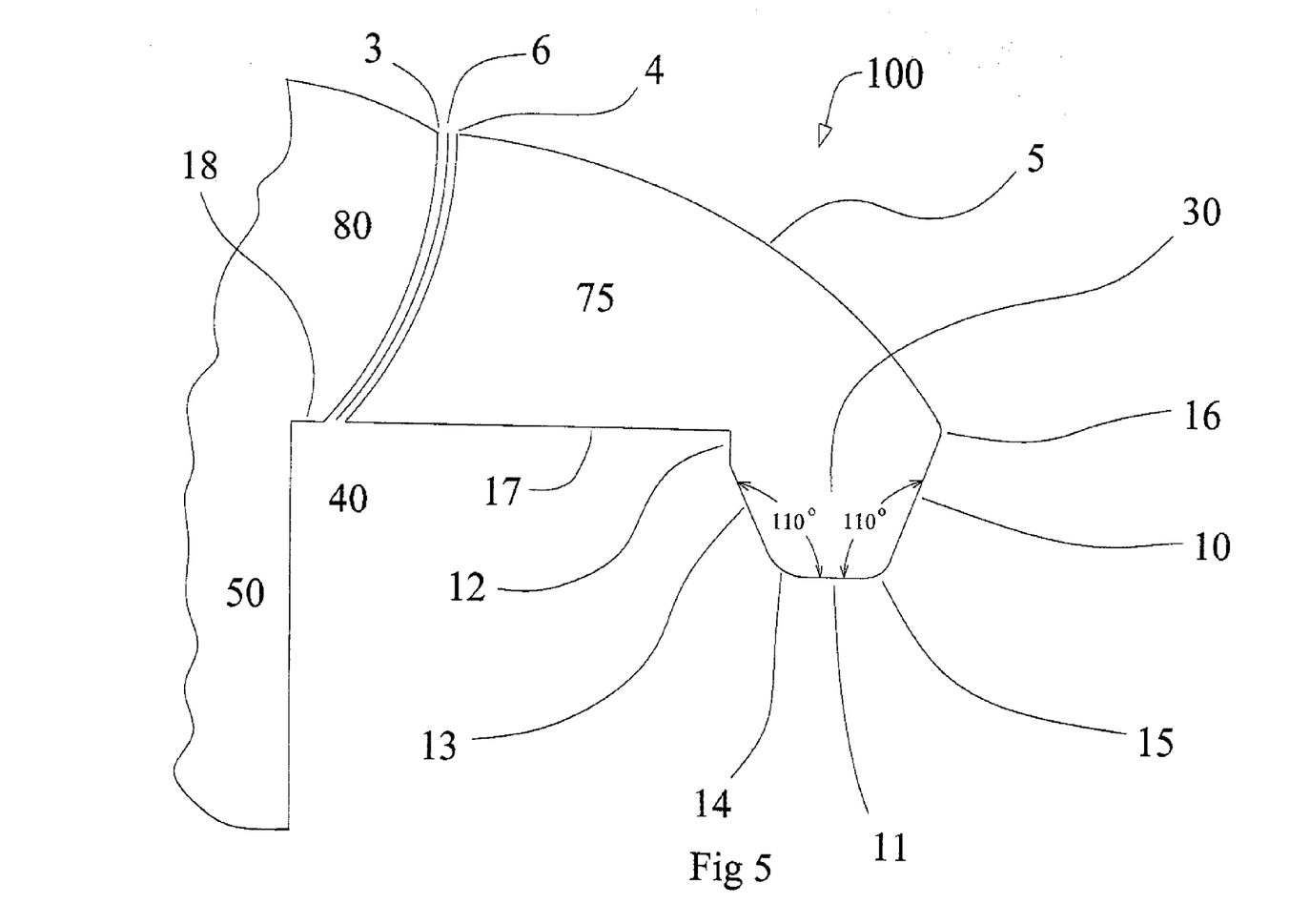
FIG. 5 is a side elevation view in an enlarged close up of the downwardly-appending lip portion with its individual features that form the annular recess wall.
Figure 6A:
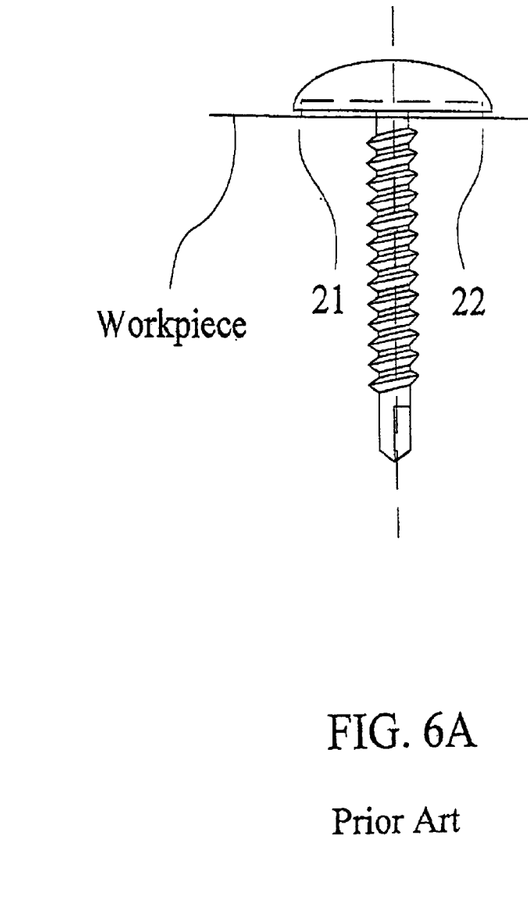
Figure 6B:
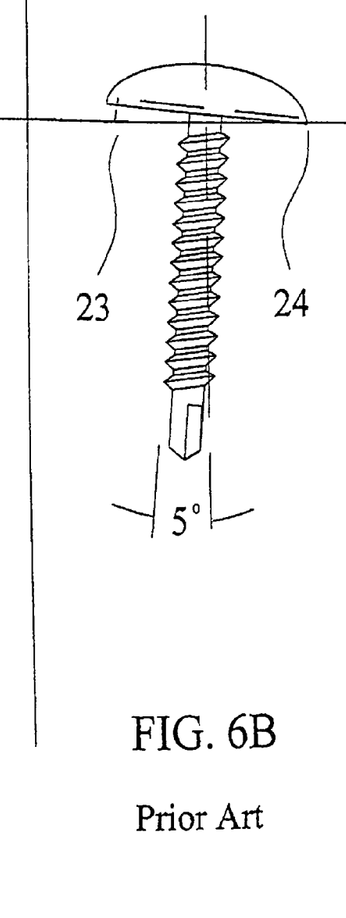
Figure 6C:
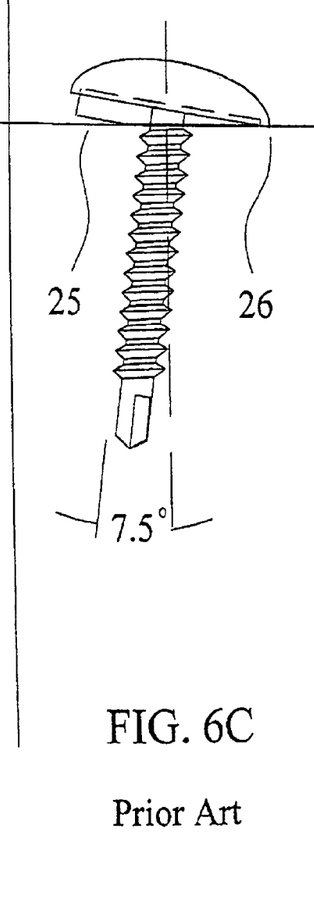
Figure 7A:
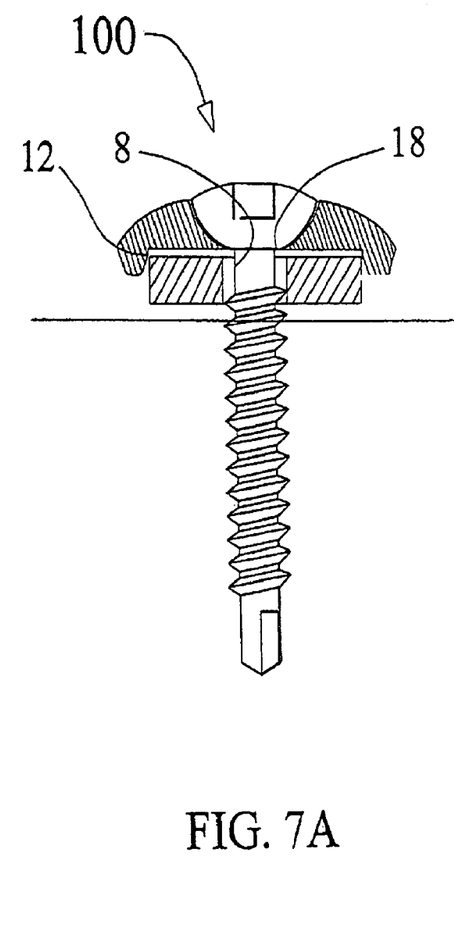
Figure 7B:
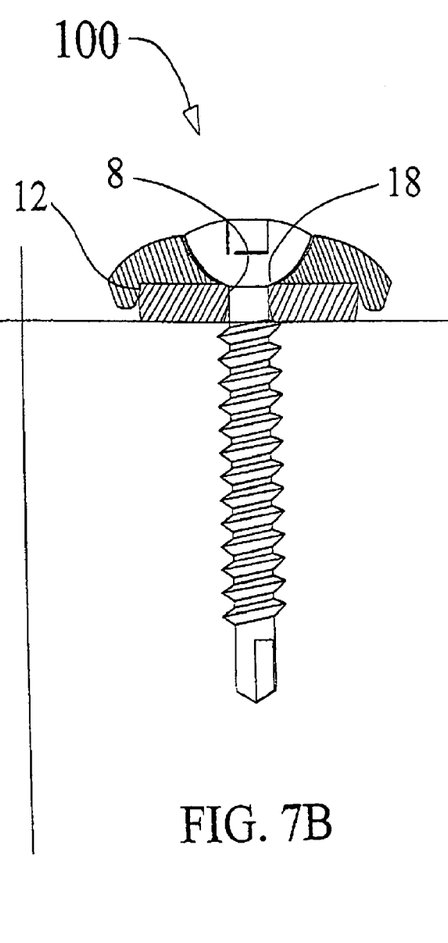
Figure 7C:
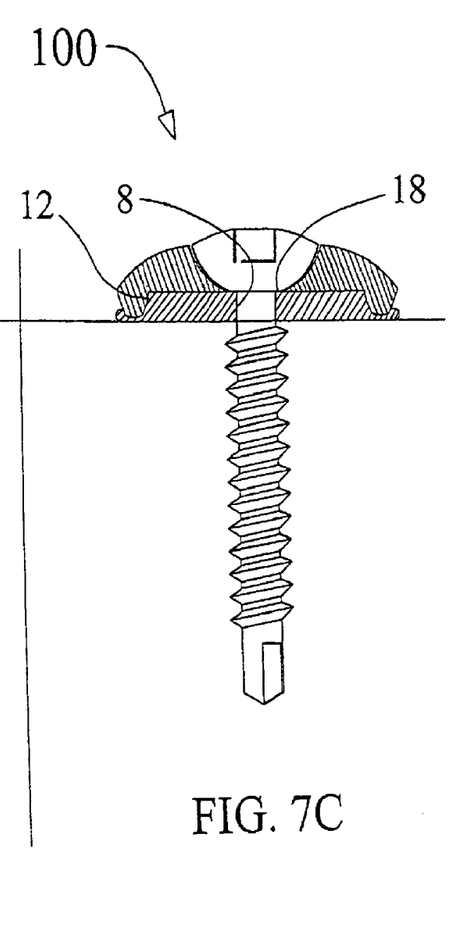

FIG. 1 includes two illustrations 1-A and 1-B and is a side elevation view of this new invention 100 installed. FIG. 2, includes three illustrations 2-A, 2-B and 2-C is a cross section side elevation view detailing the individual components which make up the completed fastener 100 unassembled (2-A) and assembled vertically (2-B) and assembled showing the free moving threaded shank at an off angle (2-C). FIG. 3 is a top plan view of the fastener head. FIG. 4 is a side elevation view in a cross section which details the individual claims and is the embodiment of the invention. FIG. 5 is a side elevation view in a cross section and is a close up of the individual features that create the recess wall and self leveling head portion. FIG. 6 is a side elevation view and is a example illustration of an existing one piece fastener with a solid head and shank connection. FIG. 7 is a side view elevation and includes three illustrations 7-A, 7-B and 7-C, showing the fastener being installed and details how the recess wall works in unison with the seal and properly seats under compression.

This inventive fastener 100 includes four portions, the threaded shank portion 50, the free moving head portion 75, an upper seal 6, and a lower recess seal 7, which combine together and create a self-leveling headed fastener 100. The threaded shank portion 50 is inserted through a nylon or rubber upper seal 6, then through the free moving head portion 75, and finally through the rubber recess seal 7. The fastener threaded shank portion 50 includes a frusto-hemispherical head 1, having a flat top surface 2 bearing a tool fitting, a curved ball bottom 3, and a threaded shank 9, and a smooth thread-less portion on the shank 8. A shank portion 50 is connected to the free moving head portion base portion 80, the shank portion bearing screw threads 9 and a tip portion 90 as is well known in the art. The threaded shank portion 50 and the free moving head portion 75 each contain circular outer surfaces, FIGS. 3-5.

Further, this fastener also has a free moving head portion 75, which has a frusto-hemispherical head 5, a hollow center formed in a rounded cup shape 4, a flat base portion 17, and a peripheral edge 16. A downwardly-appending lip portion 30 extends from the peripheral edge 16 and defines an annular recess 40 in the free moving head base portion 75. The annular recess 40 has a flat upper surface created by two pieces defined as the threaded shank portion 50 and the free moving head portion 75, more particularly numbered as features 17 and 18. The lip portion 30 has a 110-degree angled outer edge 10, a curved lower edge 15, a substantially wide and flat bottom 11, and an inner edge which is curved at the bottom 10% 14, a 70% mid portion which is angled at 110-degrees 13, and a vertical 20% upper portion 12 terminating in the annular recess flat upper surface 17.

The threaded shank portion 50 and the free moving head portion 75 combine to create a ball joint to allow the fastener to self-level the head regardless of the angle the shank portion 50 is installed off vertical. The ball 3 on the bottom of the head 80 on the threaded shank portion 50 combines with the cup 4 on the free moving head 75 and creates a durable head that can rotate to any position up to 30-degrees off vertical and allow the head 75 to self level under compression of installation. The free moving head portion 75 also aids the installer to hold the free moving head tightly in their fingers without the head spinning in their fingers causing friction burn, while the threaded shank portion 50 spins inside the center of the free moving head 75, further, the free moving head does not spin therefore the seal within the recess does not spin or bind and the seal is not damaged during installation.

A thin nylon or rubber seal 6 is installed between the ball 3 of head 80 and the cup 4 of the free moving head 75 to stop the ingress of water into the ball joint (3 and 4) which will cause rusting and electrolysis, further to stop the ingress of water into the recess 40 via the ball 3 and cup 4.

The rounded or convex head shape 1 of the threaded shank portion 80, and the convex free moving head portion 75 is also convex and low profile to reduce friction between unloading snow and ice and the head of the fastener to reduce head shear.

The peripheral edge 16 is located below the mid point near the bottom of the head 75 for the purpose of creating a ramp 5 to direct snow and ice over the top of the head which will apply a downward force as snow and ice slide over the head 75, and will not allow the unloading snow and ice to ingress under the head 75 and cause uplift.

The recess 40 is designed to accommodate a rubber seal 7 that when in an uncompressed state said seal 7 fills the recess 40 from the threaded section of the shank 9 to the vertical wall 12 of the annular recess downwardly appending lip portion 30, under compression the vertical wall 12 stops the top portion of the rubber seal 7 from expanding laterally from center and causes the rubber seal to instead compress and close the seal towards the center and seat around the smooth unthreaded portion 8 of the shank 50.

The annular mid portion of the recess wall at an angle of 110-degrees 13 allows the lower portion of the seal to compress and transition from an inward motion towards the center 8 at the top portion of the seal, to an outward motion at a gradual rate towards the downwardly appending lip portion 30. The unique design compresses the seal around the center of the shank 8 to block the ingress of water through the ball 3 and the cup 4 into the recess area 40.

The lowermost portion of the annular lip portion 30 is rounded 14 so the seal is not cut or pinched by an otherwise shape edge.

The bottom of the downwardly appending lip portion 30 is substantially flat and wide 11 in order to allow a small portion of seal to escape the confines of the recess 40 and create a scratch barrier between the lip portion 30 and the workpiece being fastened 19.

The outer edge of the lip portion 15 is rounded to allow a small portion of seal 7 to entirely escape the lip portion 30 without being cut or pinched.

Completing the recess lip portion 30 the outer edge is angled outwards away from center at 110-degrees 10 from the lowermost curve 15 up to the peripheral edge 16, and is designed to create a "V" shape laterally 95 to protect exposed seal from damage due to unloading snow and ice pushing the seal over the heads peripheral edge 16 and therefore tearing it off. The "V" shape is created by the edge of the fastener at 110-degrees 10 and the workpiece 19.

The above disclosure is sufficient to enable one of ordinary skill in the art to practice the invention, and provides the best mode of practicing the invention presently contemplated by the inventor. While there is provided herein a full and complete disclosure of the preferred embodiment of the invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features and the like.

Therefore, the above description and illustrations should not be construed as limiting the Therefore, the above description and illustrations should not be construed as limiting the scope of the invention, which is defined by the appended claims.

What is claimed as invention is:

1. A fastener apparatus having a free-moving, self-leveling, self-sealing, and low profile head for securing a workpiece, the fastener apparatus comprising in combination:
    (a) a first head which is a frusto-hemispherical head comprising a flat top surface bearing a tool fitting, a frusto-hemispherical outer surface, a curved ball base, a peripheral edge, and a shank comprising a threadless portion connected to the curved ball base, screw threads and a tip, whereby the threadless portion of the shank connected to the curved ball base defines a flat portion of the first head orthogonal to the shank;
    (b) a second head which is a free moving frusto-hemispherical head having a circular outer surface, a concave top surface sized to receive the curved ball base of the first head, a peripheral edge, a downwardly-appending lip extending from the peripheral edge of the second head and defining an annular recess with a flat upper surface corresponding to the flat portion of the first head orthogonal to the shank, the downwardly-appending lip comprising six co-dependent angles from the flat upper surface of the second head and extending radially terminating at the peripheral edge of the second head, the six co-dependent angles of the downwardly-appending lip further comprising members selected from the list consisting of a vertical annular wall, a wall angled 110 degrees from a substantially flat bottom, a curved lower edge, the substantially flat bottom, a curved outer edge, and an outer edge angled 110 degrees from the substantially flat bottom;
    (c) a first annular gasket comprising a top surface and a bottom surface, the first annular gasket sized to receive and to be carried on the threadless portion of the shank of the first head, whereby the first annular gasket defines a first uncompressed position contained radially within the annular recess of the second head and the flat portion of the first head orthogonal to the shank provides a seal having a peripheral edge equal to the second head downwardly-appending lip, and whereby the first annular gasket further defines a second compressed position wherein the top surface of the first annular gasket is compressed inward to seal around the flat portion of the first head orthogonal to the shank, whereby the first annular gasket seals the entire annular recess and the bottom surface of the first annular gasket extends radially beyond the downwardly-appending lip; and
    (d) a second annular gasket sized to receive the curved ball base of the first head within the second head concave top surface:
    whereby the flat portion of the first head orthogonal to the shank defines a portion of the annular recess, and the flat upper surface of the second head and downwardly appending lip of the second head define the remaining portion of the annular recess, and the first annular gasket contacts with the flat portion of the first head orthogonal to the shank and the flat upper surface of the second head and stops the ingress of materials;
    whereby the first head defines a portion of an entire fastener apparatus top surface, and the second head defines the remaining portion of the entire fastener apparatus top surface providing one low profile frusto-hemispherical head shape when the fastener apparatus is applied and stationary; and whereby the fastener apparatus provides self-leveling for the second head when the shank is installed into a workpiece at an angle deviating up to 30 degrees from vertical.

2. A free-moving, self-leveling, low profile fastener apparatus for securing a workpiece, the fastener apparatus comprising:

(a) a shank comprising a first head which is a frusto-hemispherical head comprising a flat top surface bearing a tool fitting, an un-threaded surface, a threaded surface, a frusto-hemispherical outer surface, a curved ball base, a peripheral edge, and a tip, whereby the curved ball base of the first head of the shank defines a flat portion orthogonal to the shank;

(b) a second head which is a free moving frusto-hemispherical head comprising a circular outer surface, a concave top surface sized to receive the curved ball base of the first head of the shank, a peripheral edge, a downwardly-appending lip extending from the peripheral edge of the second head and defining an annular recess with a flat upper surface corresponding to the flat portion of the curved ball base of the first head of the shank, the downwardly-appending lip comprising six co-dependent angles from the flat upper surface of the second head and extending radially, the downwardly-appending lip terminating at the peripheral edge of the second head, the six co-dependent angles of the downwardly-appending lip further comprising members selected from the list consisting of a vertical annular wall, an inner wall angled 110 degrees from the substantially flat bottom, a curved lower edge, a substantially flat bottom, a curved outer edge, and an outer edge angled 110 degrees from the substantially flat bottom, whereby the first annular gasket provides a seal having a peripheral edge equal to the downwardly-appending lip vertical annular wall:

(c) assembly for self-leveling the second head under compression of installation wherein the fastener apparatus provides for a self-leveling flat top surface of the second head when the shank is installed into a workpiece at an angle deviating up to 30 degrees from vertical:

(d) assembly for preventing the ingress of elements into the fastener apparatus comprising a first annular gasket comprising a top surface and a bottom surface, the first annular gasket sized to receive and to be carried on the un-threaded surface of the shank, whereby the first annular gasket defines a first uncompressed position contained radially within the flat upper surface of the annular recess of the second head and the flat portion of the curved ball base of the first head of the shank, and whereby the first annular gasket defines a second compressed position wherein the top surface of the first annular gasket is compressed inward to seal around the shank threadless portion whereby the first annular gasket seals the entire annular recess and the curved ball base of the first head of the shank, and the bottom surface of the first annular gasket extends radially beyond the downwardly appending lip; and (e) assembly for sealing the un-threaded surface of the shank comprising a second annular gasket sized to receive sized to receive the curved ball base of the shank within the concave top surface of the second head.

* * * * *